(12) United States Patent
Terui et al.

(10) Patent No.: US 6,792,690 B2
(45) Date of Patent: Sep. 21, 2004

(54) INSIDE MICROMETER

(75) Inventors: Katsunobu Terui, Higashihiroshima (JP); Tadashi Konishi, Higashihiroshima (JP); Minoru Shibahashi, Higashihiroshima (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/217,625

(22) Filed: Aug. 14, 2002

(65) Prior Publication Data

US 2003/0037455 A1 Feb. 27, 2003

(30) Foreign Application Priority Data

Aug. 21, 2001 (JP) ........................................ 2001-250741

(51) Int. Cl.[7] .............................. G01B 3/18; G01B 5/12
(52) U.S. Cl. ......................................... 33/821; 33/827
(58) Field of Search ......................... 33/813, 826, 827, 33/828, 829, 821, 822, 814, 831

(56) References Cited

U.S. PATENT DOCUMENTS

| 347,844 | A | * | 8/1886 | Usher | 33/817 |
| 726,003 | A | * | 4/1903 | Starrett | 33/827 |
| 1,267,946 | A | * | 5/1918 | Wester | 33/827 |
| 2,134,516 | A | * | 10/1938 | James | 33/827 |
| 2,193,939 | A | * | 3/1940 | Sanford | 33/821 |
| 2,287,097 | A | * | 6/1942 | Graham | 33/199 R |
| 2,607,999 | A | * | 8/1952 | Stedman | 33/828 |
| 2,847,764 | A | * | 8/1958 | Schaerer | 33/702 |
| 4,547,970 | A | | 10/1985 | Brewster | 33/813 |
| 5,345,692 | A | * | 9/1994 | Babitchenko | 33/828 |
| 6,286,227 | B1 | | 9/2001 | Corby, Jr. | 33/827 |

* cited by examiner

Primary Examiner—Diego Gutierrez
Assistant Examiner—R Alexander Smith
(74) Attorney, Agent, or Firm—Oliff & Berridge, PLC (57) ABSTRACT

An inside micrometer including an inside micrometer body (1) with a first spindle (11) screwed in an advanceable and retractable manner in an axial direction, to which anvil (30) having different length in increments of a predetermined dimension and an extending collar (40) interposed between the anvil (30) and the inside micrometer body (1) are selectively attached to adjust the measurement range, has an extending rod (50) selectively attached to the inside micrometer body (1) in an attachable and detachable manner and having a second spindle 58 which is advanced and retracted together with the first spindle (11), so that the length of the second spindle (58) is added to the measurement range extended from one of the anvils (30) as well as the length of the extending collar (40), thereby reducing the number of the anvils (30).

4 Claims, 10 Drawing Sheets

United States Patent US 6,792,690 B2

INSIDE MICROMETER

BACKGROUND OF THE INVENTION

1. Field of the Invention

The present invention relates to an inside micrometer. More specifically, it relates to an inside micrometer with reduced number of components.

2. Description of Related Art

Figure 8:
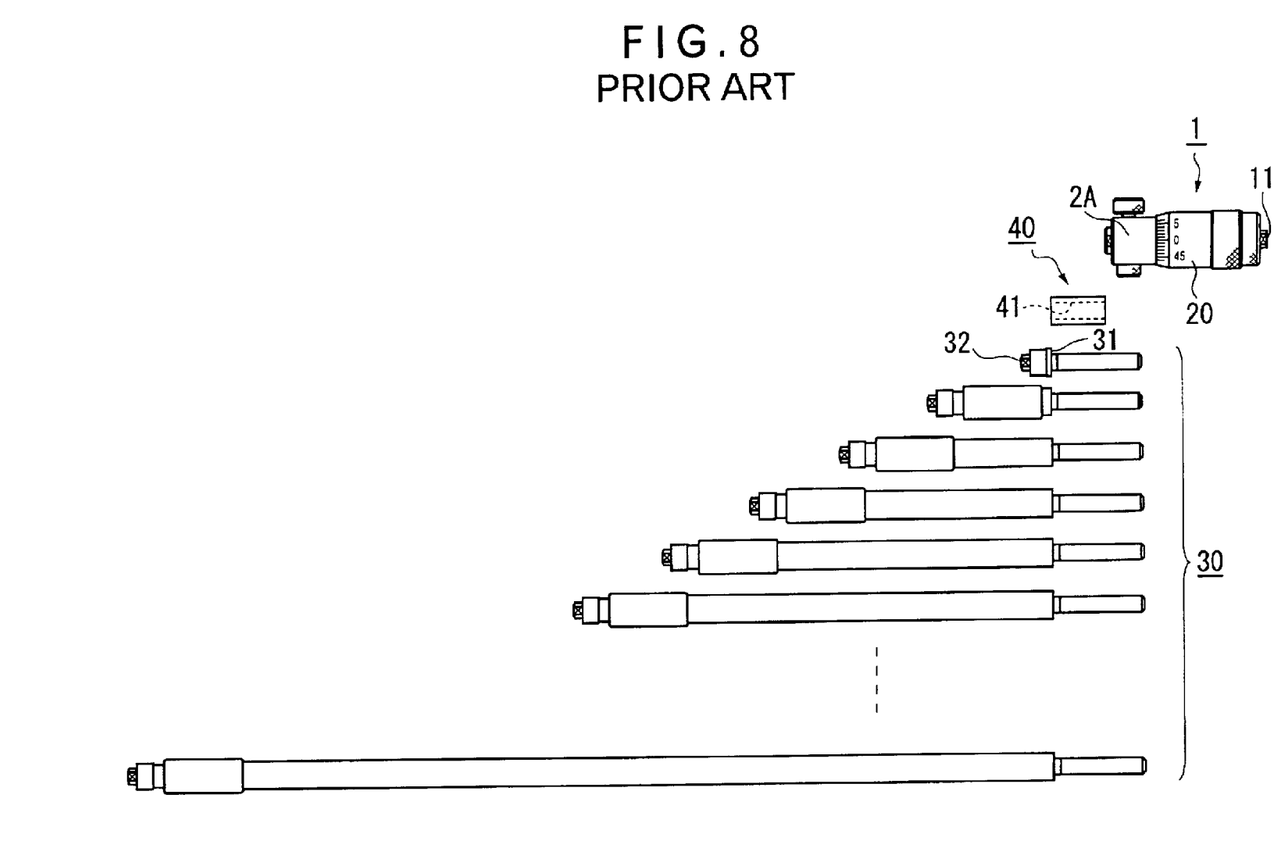
FIG. 8 is an illustration showing an arrangement of a conventional inside micrometer.

As shown in FIG. 8, a conventional inside micrometer has an inside micrometer body 1 having a first spindle 11 advancing and retracting in accordance with rotation of a thimble 20, a plurality of anvils 30 of mutually different lengths in increments of a predetermined dimension, and an extending collar 40 interposed between the anvil 30 and the inside micrometer body 1.

Figure 9:
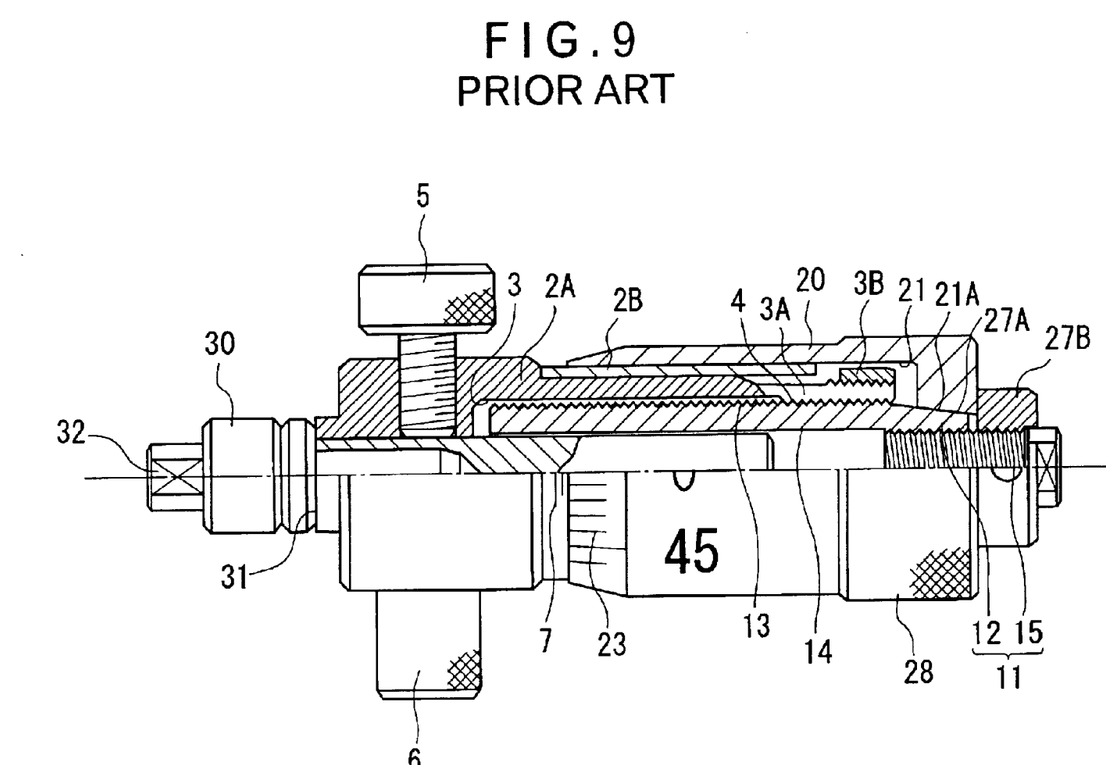
FIG. 9 is a partial side cross section showing the conventional inside micrometer body.

As shown in FIG. 9, the inside micrometer body 1 has an inner cylinder 2A having a through-hole 3 with an internal thread 4 being formed on the inner circumference thereof adjacent to a first end of the body, an outer cylinder 2B provided on the outer circumference of the inner cylinder 2A, a first spindle 11 composed of a cylindrical first spindle sheath 12 having an external thread 13 screwed to the internal thread 4 of the inner cylinder 2A and a probe 15 screwed to the first end side of the first spindle sheath 12, and a cylindrical thimble 21 covering a part of the inner cylinder 2A and the outer cylinder 2B from the first end to the second end opposite to the first end.

A plurality of slits 3A are formed along cylinder axis of the inner cylinder 2A adjacent to the first end, on which a nut 3B is screwed from the outside. A setscrew 5 having a knob on the head thereof and a support knob 6 are screwed to the outer circumference of the inner cylinder 2A on the second end side.

The outer circumference of the first spindle sheath 12 and an opening 21A of the thimble 21 are fitted on the first end side in a taper 27A of which diameter is increased from the first end side to the second end side, and are clamped by a nut 27B screwed to the probe 15.

A knurl 28 is formed on the outer circumference on the first end side of the thimble 20 and a scale 23 is carved on the outer circumference of the second end side thereof.

The diameter of the first end side of the anvil 30 is the same as the diameter of the through-hole 3 of the inner cylinder 2A on the second end side, which widens at a step 31 on the halfway from the first end side toward the second end side. A probe 32 is provided on the second end side of the anvil 30.

A scale 7 is carved on the outer cylinder 2B in the axial direction of the cylinder.

The extending collar 40 has a through-hole 41 having the same diameter as the first end side of the anvil 30.

In use, one of the anvils 30 of the length suitable for the target portion of the workpiece is selected, which is inserted into the inner cylinder 2A from the second end side and held by the setscrew 5. Subsequently, the thimble 20 of the inside micrometer body 1 is rotated to advance and retract the first spindle 11. When the probe 32 of the anvil 30 and the probe 5 of the first spindle 11 are in contact with the workpiece, the dimension of the target portion of the workpiece is read from the scales 7 and 23.

When the extending collar 40 is used, after the anvil 30 is inserted into the through-hole 41 of the extending collar 40, the anvil 30 is inserted into the inside micrometer body 1. Accordingly, the measurement area of the inside micrometer can be extended for the length of the extending collar 40.

Figure 10:
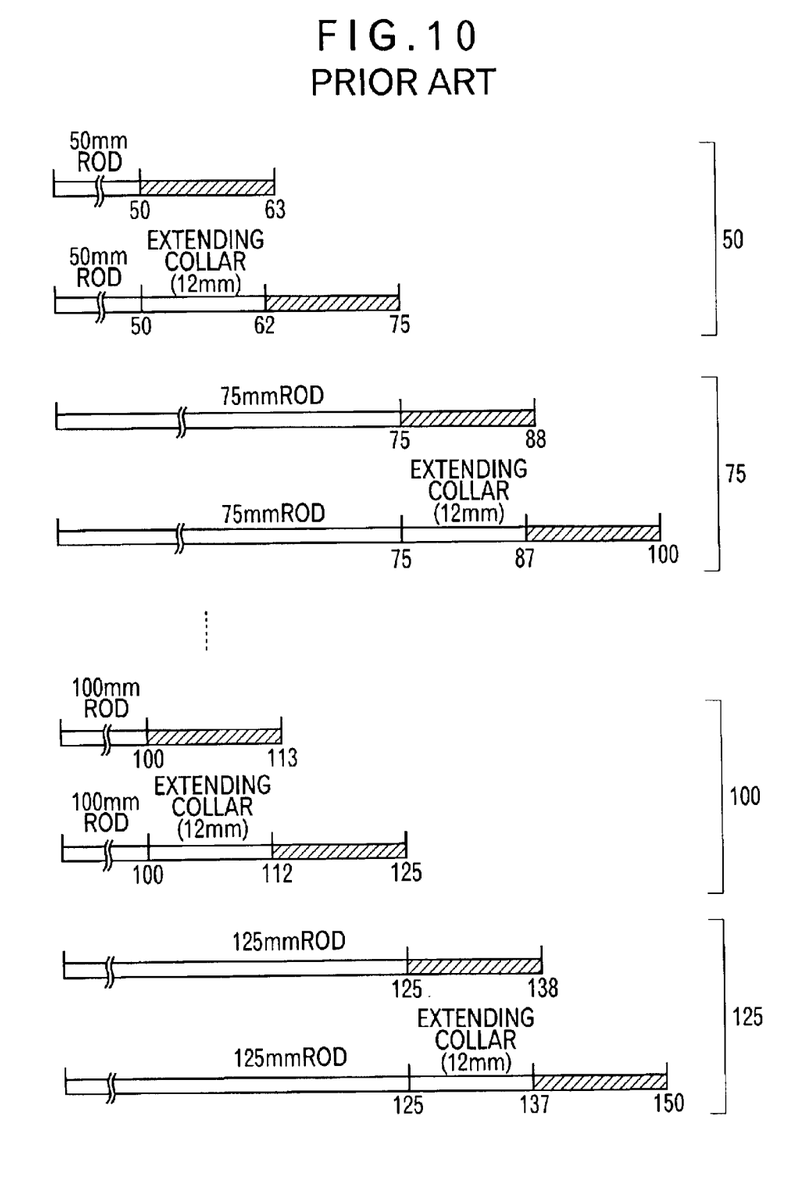
FIG. 10 is an illustration showing the measurement area of the conventional inside micrometer when the anvil, the extending collar and the extending rod are selectively used.

In actual measurement, the anvil 30 and the extending collar 40 are selectively attached to the inside micrometer body 1 according to the workpiece, thereby adjusting the measurement area of the inside micrometer as shown in FIG. 10.

As an instance, it is assumed that the moving distance of the first spindle 11 of the inside micrometer body 1 is 13 mm, the length of the extending collar 40 is 12 mm and two anvils 30 for 50 mm and 75 mm length are prepared.

In order to measure the range for 50 mm to 63 mm, the anvil 30 for 50 mm length is attached to the inside micrometer body 1.

In order to measure the range for 62 mm to 75 mm, the extending collar 40 as well as the anvil 30 for 50 mm length is attached.

In order to measure the range of 75 mm to 88 mm, the anvil 30 for 75 mm length is attached to the inside micrometer body 1.

In the same manner, the anvil 30 and the extending collar 40 are selectively used to extend the measurement area. Accordingly, continuous area can be measured by preparing anvils 30 for different lengths in increments of 25 mm.

However, such a conventional inside micrometer requires anvils 30 of different lengths in increments of 25 mm.

For instance, in order to measure the range from 50 mm to 300 mm, no less than ten anvils 30, i.e. anvils for 50 mm, 75 mm, 100 mm, 125 mm, 150 mm, 175 mm, 200 mm, 225 mm, 250 m and 275 mm lengths, have to be prepared.

According to the above, since the number of components are increased and many number of long anvils 30 have to be prepared, which requires much work and expensive cost. Further, since many number of anvils 30 have to be equipped, the size of accommodation case is increased, which is inconvenient in portable use.

SUMMARY OF THE INVENTION

An object of the present invention is to provide an inside micrometer capable of reducing number of components and production cost, and suitable for portable use.

An inside micrometer according to and aspect of the present invention includes: an inside micrometer body including a cylinder having a through-hole, the inner circumference of the through-hole being provided with an internal thread, a first spindle screwed to the internal thread in an advanceable and retractable manner from a first end of the through-hole, and a thimble provided on the outside of the cylinder, the thimble being capable of rotating integrally with the first spindle; a plurality of anvils having different lengths in increments of a predetermined dimension, the anvil being capable of attachment and detachment on the second end opposite to the first end of the through-hole of the cylinder; a first extension member provided with a through-hole to which the anvil is inserted, the first extension member being selectively interposed between the second end side of the cylinder and the anvil to adjust a measurement range; and a second extension member having a second spindle which advances and retracts together with the first spindle, the second extension member being selectively attached to the first end side of the first spindle in an attachable and detachable manner.

According to the above arrangement, when the thimble is rotated, the first spindle rotates together with the thimble. Since the external thread of the first spindle is screwed to the internal thread of the cylinder, the first spindle advances and retracts from the first end side of the cylinder in an axial direction in accordance with the pitch of the screw. The distance for the first spindle to be advanced from the first end side of the cylinder to the outside is the moving distance of the inside micrometer body.

Conventionally, the anvil attached and detached on the second end side of the through-hole of the cylinder and the first extension member interposed between the second end side of the cylinder and the anvil are selectively used to adjust the moving distance of the inside micrometer with the measurement range in accordance with the length of the workpiece.

For instance, when a short anvil is solely used, the measurement range can be set short. When the first extension member is additionally used, the measurement range can be extended by the length of the first extension member. When the anvil is exchanged with a longer one, the measurement range can be further extended, and the measurement range can be adjusted in the same manner.

When the second extension member selectively used together with the anvil and the first extension member is used, following advantages can be obtained.

As described above, after an anvil of a predetermined length is attached to the inside micrometer body and the first extension member is interposed to extend the measurement range, the second extension member is attached to further extend the measurement range.

In other words, the measurement range which can be extended from a single anvil was a sum of the anvil and the length of the first extension member in the conventional arrangement. However, by adding the second extension member, the measurement range can be extended to the sum of the anvil, the first extension member and the second extension member.

Accordingly, the conventionally required length of anvil, i.e. an anvil of the length adding the sum of the length of the first extension member and the second extension member can be omitted.

At this time, the number of the anvils which conventionally required but can be omitted increases in accordance with increase in the length of the measurement range, the above effect becomes further eminent.

A plurality of long anvils can be omitted by the provision of the single second extension member is not only the reduction of components but also is of great importance in reduction of the production cost and the size of the accommodation case in view of the size of the long anvil and manufacturing work thereof.

In the present invention, the relationship of $k \leq v$, $s \leq v+k$, $d \leq v+k+s$ may preferably be satisfied, where the moving distance of the first spindle is $v$, the length of the first extension member is $k$, the length of the second spindle of the second extension member is $s$ and the increment of the length of the anvil is $d$.

According to the above arrangement, the measurement range capable of being measured by the inside micrometer can be continuous without gap.

Measurement range S1 of an inside micrometer attached with an anvil A of length a can be represented as: $a \leq S1 \leq a+v$, since the moving distance of the inside micrometer is represented as v.

The measurement range S2 with the anvil A and the first extension member of length k being attached can be represented as: $a+k \leq S2 \leq a+k+v$. Since $k \leq v$ and $a+k \leq a+v$, the relationship of (minimum value of S2)≤(maximum value of S1) is established. Accordingly, S1 and S2 have a crossover range or are continuous.

The measurement range S3 with the anvil A and the second extension member of length s being attached can be represented as: $a+s \leq S3 \leq a+s+v$. Since $s \leq k+v$ and $a+s \leq a+k+v$, the relationship of (minimum value of S3)≤(maximum value of S2) is established. Accordingly, S2 and S3 have a crossover range or are continuous.

The measurement range S4 with the anvil A, the first extension member and the second extension member being attached can be represented as: $a+k+s \leq S4 \leq a+k+s+v$. Since $k \leq v$ and $a+k+s \leq a+s+v$, the relationship of (minimum value of S4)≤(maximum value of S3) is established. Accordingly, S3 and S4 have a crossover range or are continuous.

When the anvil A is exchanged into another anvil having length a+d, the measurement S5 can be represented as: $a+d \leq S5 \leq a+d+v$. At this time, since $d \leq v+k+s$ and $a+d \leq a+v+k+s$, the relationship of (minimum value of S5)≤(maximum value of S4) is established. Accordingly, S4 and S5 have a crossover range or are continuous.

As described above, according to the inside micrometer having the above arrangement, continuous measurement range can be set by a smaller number of anvils as compared to a conventional arrangement.

In the present invention, the second extension member may preferably include: a second extension member body having a through-hole at the center thereof, the second extension member body being attached to the first end side of the thimble in an attachable and detachable manner; a second spindle inserted in an being advanceable and retractable manner from the first end side of the through-hole of the second extension member body in an axial direction; and a biasing means for biasing the second spindle toward the first spindle.

According to the above arrangement, since the position of the second spindle is not fixed in the through-hole of the second extension member but is advanceable and retractable in the axial direction and the second spindle is biased toward the first spindle by the biasing means, when the second extension member is attached to the first end side of the thimble, the first end of the first spindle and the second end of the second spindle are in contact with each other, so that the second end of the second spindle is pushed by the first end of the first spindle, thereby slidably moving the second spindle toward the first end side. Accordingly, the effect equal to adding the length of the second spindle to the first spindle can be attained, thereby effectively working as an extension member.

At this time, even when the length for the first spindle to project from the cylinder of the inside micrometer body changes, the position of the second spindle is flexibly changed and the second spindle can be touched to the first end of the first spindle without generating gap. In other words, since the first and the second spindles are integrally advanced and retracted, the measurement accuracy is not deteriorated.

In the present invention, an external thread may preferably be formed on one of the second end side of the second extension member and the first end side of the thimble, and an internal thread to be screwed to the external thread may preferably be formed on the other of the second end side of the second extension member and the first end side of the thimble.

According to the above arrangement, since the second extension member moves integrally with the thimble by screwing the first end side of the thimble and the second end side of the second extension member, the second extension member moves together with the first spindle when the thimble moves with the first spindle by rotating the thimble, thereby effectively working as an extension member.

Further, since the thimble and the second extension are screwed and therefore are easily attached and detached, portability can be improved and, since any one of the thimble and the second extension member may be rotated, operability can also be enhanced.

DETAILED DESCRIPTION OF PREFERRED EMBODIMENT(S)

An embodiment of the present invention will be described below with reference to attached drawings.

Figure 1:
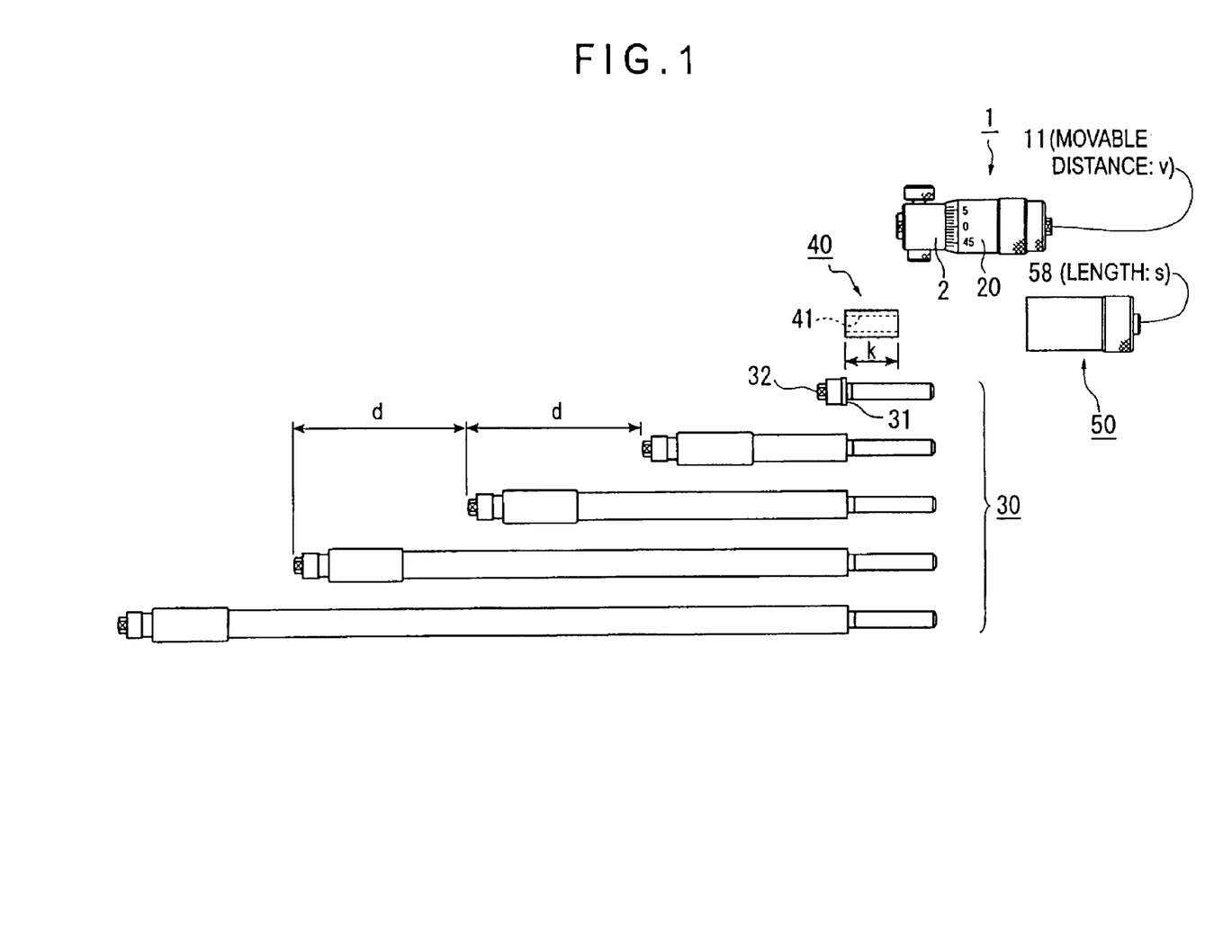
FIG. 1 is an illustration showing an arrangement of an inside micrometer according to an embodiment of the present invention.

As shown in FIG. 1, an inside micrometer according to the present embodiment has an inside micrometer body 1, a plurality of anvils 30 of different length in increments of a predetermined dimension, an extending collar 40 as a first extension member, and an extending rod 50 as a second extension member.

Figure 2:
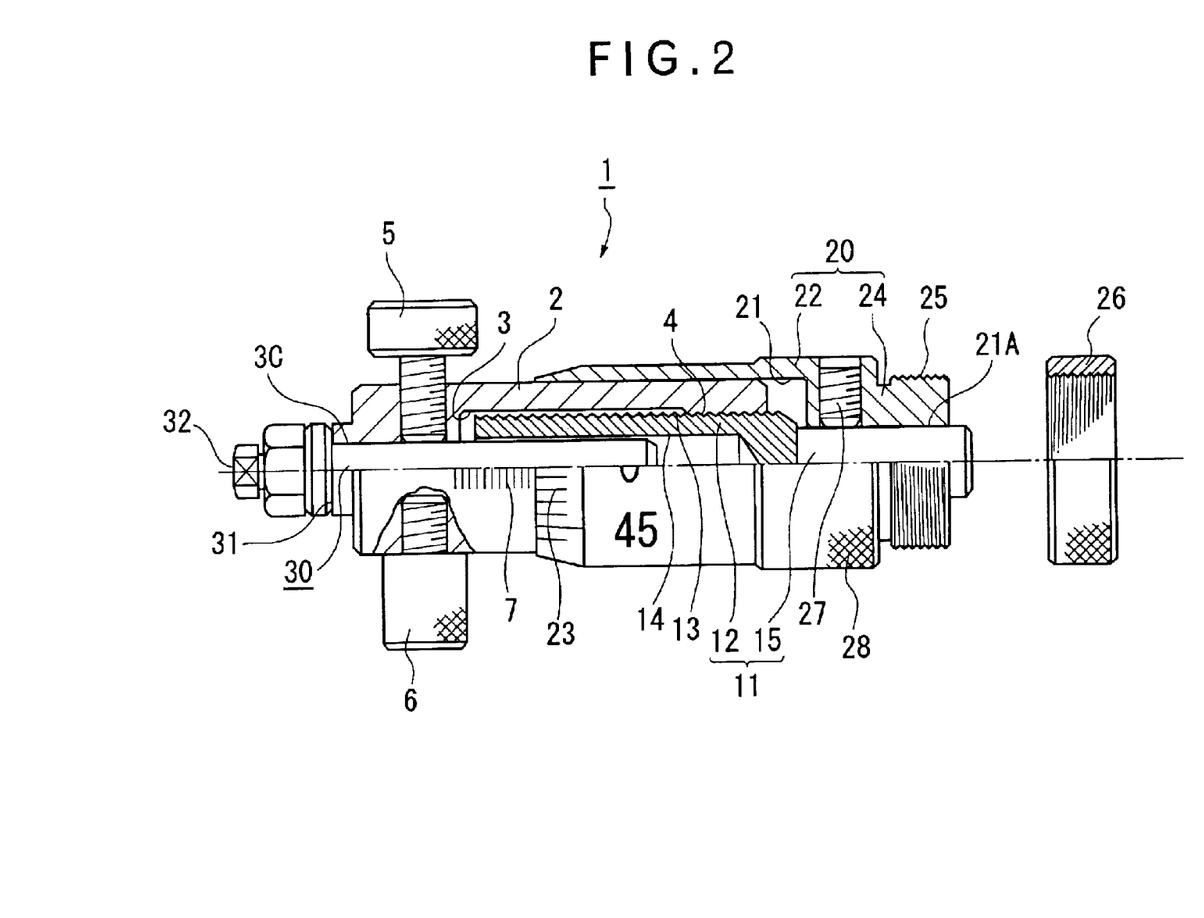
FIG. 2 is a partial side cross section showing an inside micrometer body of the aforesaid embodiment.

As shown in FIG. 2, the inside micrometer body 1 has a cylinder 2 having a through-hole 3 with an internal thread 4 being formed on the inner circumference thereof, a first spindle 11 screwed to the internal thread 4 of the cylinder 2 to be axially advanceable and retractable from a first end side of the through-hole 3 of the cylinder 2, and a thimble 20 integrally rotatable with the first spindle 11 and provided on the outside of the cylinder 2.

The internal thread 4 is provided around the first end side of the opening of the through-hole 3 of the cylinder 2. A setscrew 5 having a knob at the top thereof and a support knob 6 having holding portion on the circumference thereof are screwed on the outer circumference of a second end (opposite to the first end) side of the cylinder 2.

A scale 7 is carved along axial direction on the outer circumference of the cylinder 2 by laser marking.

The first spindle 11 has a first spindle sheath 12 having external thread 13 substantially on the entire outer circumference thereof and a probe 15 integrally formed on the tip end on the first end side of the first spindle sheath 12. The diameter of the probe 15 is smaller than the diameter of the first spindle sheath 12.

The external thread 13 of the first spindle sheath 12 is screwed to the internal thread 4 of the cylinder 2, so that the first spindle 11 is advanced and retracted from the first end side of the cylinder 2 in accordance with the rotation of the first spindle 11.

The first spindle sheath 12 has a hole 14 opened in the second end direction and parallel to the axis thereof. The diameter of the hole 14 of the first spindle sheath 12 is slightly greater than the diameter of an opening 3C of the cylinder 2.

The thimble 20 is of cylindrical shape having a through-hole 21 parallel to the cylinder axis thereof, which has a thin first cylinder 22 covering a part of the cylinder 2 from the first end side to the second end side and having an inner diameter slightly greater than the outer diameter of the cylinder 2, and a thick second cylinder 24 covering the probe 15 of the first spindle 11 from the first end side of the cylinder 2 and having an inner diameter substantially equal to the diameter of the probe 15. An external thread 25 is provided on the outer circumference of the second cylinder 24 on the first end side. A ring-shaped cap 26 is usually screwed to the external thread 25. A screw 27 is perpendicularly screwed to the through-hole 21 on the second end side of the second cylinder 24. The probe 15 and the thimble 20 are connected by the screw 27 so that the first spindle 11 and the thimble 20 are integrally rotated. A scale 23 is formed along the outer circumference of the first cylinder 22 of the thimble 20 on the second end side. A knurl 28 is provided at the central portion of the thimble 20.

In the present embodiment, the moving distance v of the first spindle 11 is 13 mm. The pitch of the internal thread 4 of the cylinder 2 and the external thread 13 of the first spindle 11 is carved so that the first spindle 11 moves by 1 mm in axial direction when the first spindle 11 is rotated twice. Accordingly, the scale 7 formed on the cylinder is 0.5 mm pitch. The scale 23 formed on the thimble 20 is capable of reading 0.01 mm unit by dividing one rotation by fifty.

A plurality of anvils 30 having different lengths d in increments of a predetermined dimension are prepared. The anvil 30 has a long stick-shaped body of which diameter on the first end side has the same diameter as the opening 3C on the second end side of the through-hole 3 of the cylinder 2, where a step 31 which increases diameter is formed on the halfway from the first end side to the second end side of the anvil 30 and a probe 32 is provided at the tip end of the second end side.

In the present embodiment, the anvils 30 have different lengths d in increments of 50 mm.

The extending collar 40 is a cylinder having a through-hole 41 therein, the diameter of the through-hole 41 being greater than the diameter of the first end side of the anvil 30 and being smaller than the diameter of the step 31 of the anvil 30. The outer diameter of the extending collar 40 is greater than the diameter of the second end side opening 3C of the cylinder 2.

In the present embodiment, the length k of the extending collar 40 is 12 mm long.

Figure 3:
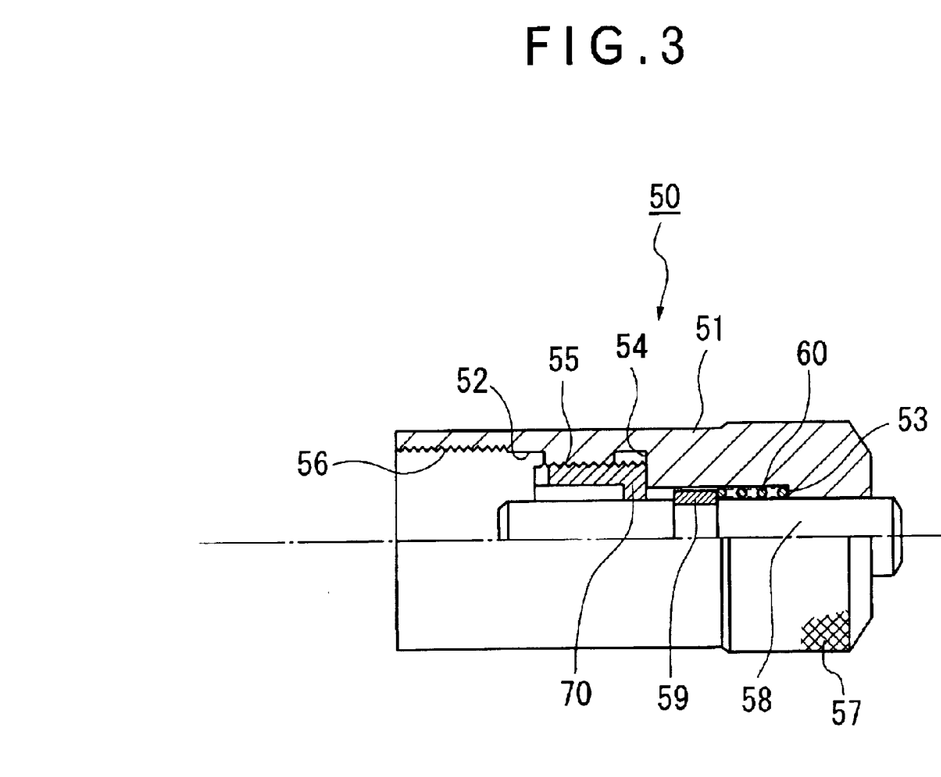
FIG. 3 is a partial side cross section showing an extending rod of the aforesaid embodiment.

As shown in FIG. 3, the extending rod 50 has an extending rod body 51 as a body of second extension member having a through-hole 52, a second spindle 58 capable of advancing and retracting in the axial direction from the first end side of the through-hole 52 off the extending rod body 51, a spring 60 as a biasing means for biasing the second spindle 58 toward the second end side, and a stopper 70.

The extending rod body 51 is of cylindrical shape and the through-hole 52 is parallel to the cylinder axis. In the through-hole 52, diameter on the first end side is the smallest and equal to the opening 21A of the thimble 20 on the first end side, where diameter-widening two steps, i.e. a first step 53 and a second step 54 are provided at the halfway toward the second end side. An internal thread 55 is provided at the halfway from the second step of the through-hole 52 of the extending rod body 51 to the second end side opening. An internal thread 56 is provided adjacent to the second end side opening.

A knurl 57 is provided on the outer circumference of the extending rod body 51 on the first end side.

The second spindle 58 is provided in the through-hole 52 of the extending rod body 51 and has the same diameter as the probe 15 of the first spindle 11. A ring 59 having greater diameter than the other portion is provided at the halfway of the second spindle 58. The spring 60 is interposed between the ring 59 and the first step 53 in the through-hole 52 to bias the second spindle 58 toward the second end.

The ring-shaped stopper 70 is provided in the through-hole 52 of the extending rod body 51. The stopper 70 is screwed to the internal thread 55 of the extending rod body 51 after the second spindle 58 and the spring 60 are inserted from the second end side. The ring 59 of the second spindle 58 is hooked to the stopper 70 to prevent the second spindle 58 from protruding out toward the second end by the biasing force of the spring 60.

The external thread 13 of the first spindle 11 and the internal thread 4 of the cylinder 2 are right-hand thread, while the internal thread 56 of the extending rod body 51 and the external thread 25 of the thimble 20 are left-hand thread.

In the present embodiment, the length s of the second spindle 58 of the extending rod 50 is 25 mm long.

In use, the anvil 30, the extending collar 40 and the extending rod 50 are selectively attached to the inside micrometer body 1 in accordance with the workpiece.

Figure 4:
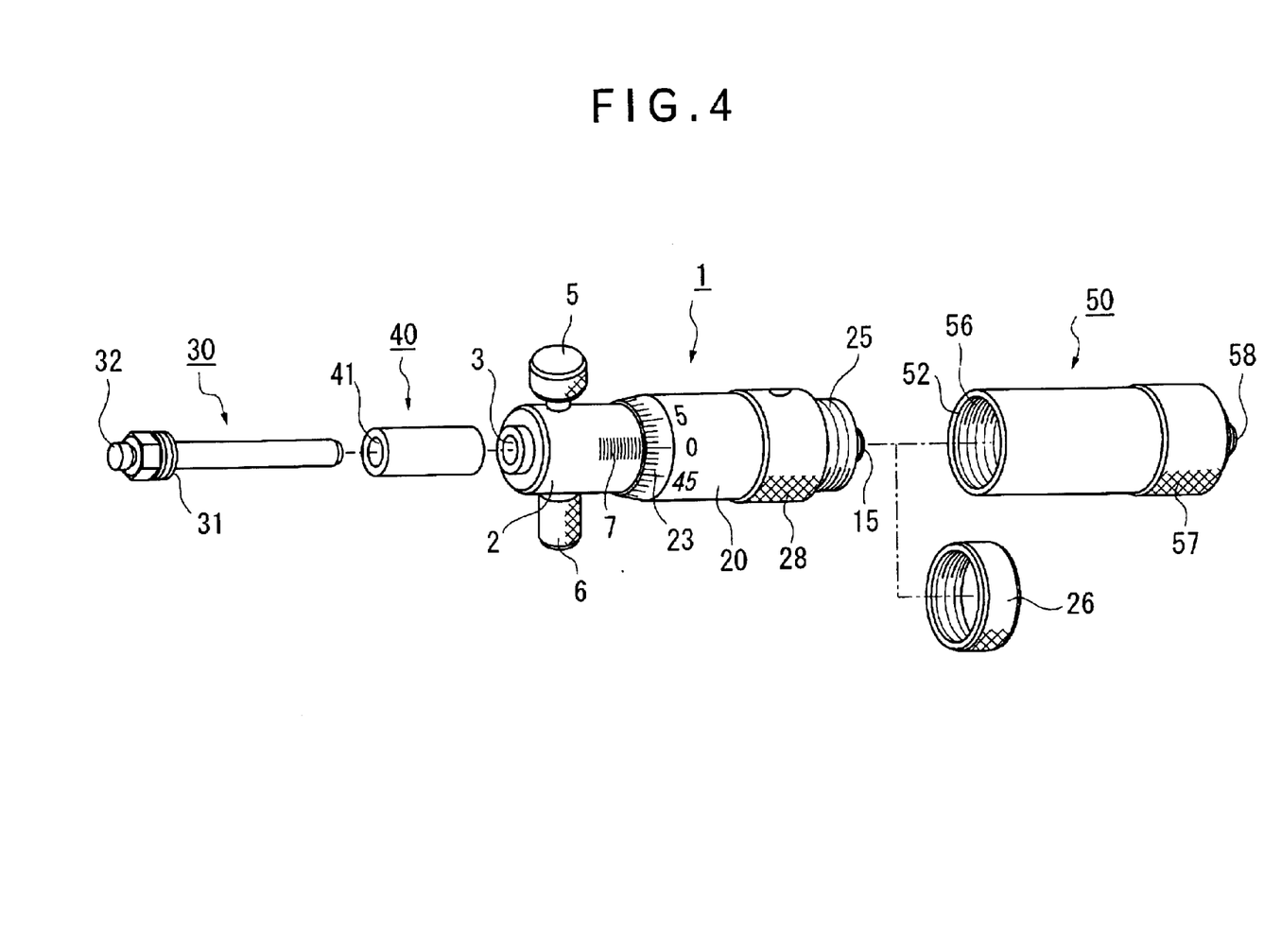
FIG. 4 is an exploded perspective view showing an arrangement of the inside micrometer according to the aforesaid embodiment.

FIG. 4 shows a structure of the inside micrometer of the present embodiment.

Initially, when the anvil 30 is attached to the inside micrometer body 1 in measurement, the setscrew 5 of the cylinder 2 is loosened to insert an end of the anvil 30 from the opening 3C of the cylinder 2 until it is stopped by the step 31, which is thereafter fixed by screwing the setscrew 5.

When the extending collar 40 is used, the anvil 30 is inserted through the through-hole 41 of the extending collar 40 into the second end side of the through-hole 3 of the cylinder 2. On the other hand, in order to attach the extending rod 50, the cap 26 is detached and the internal thread 56 of the extending rod 50 is screwed to the external thread 25 of the thimble 20.

Figure 5:
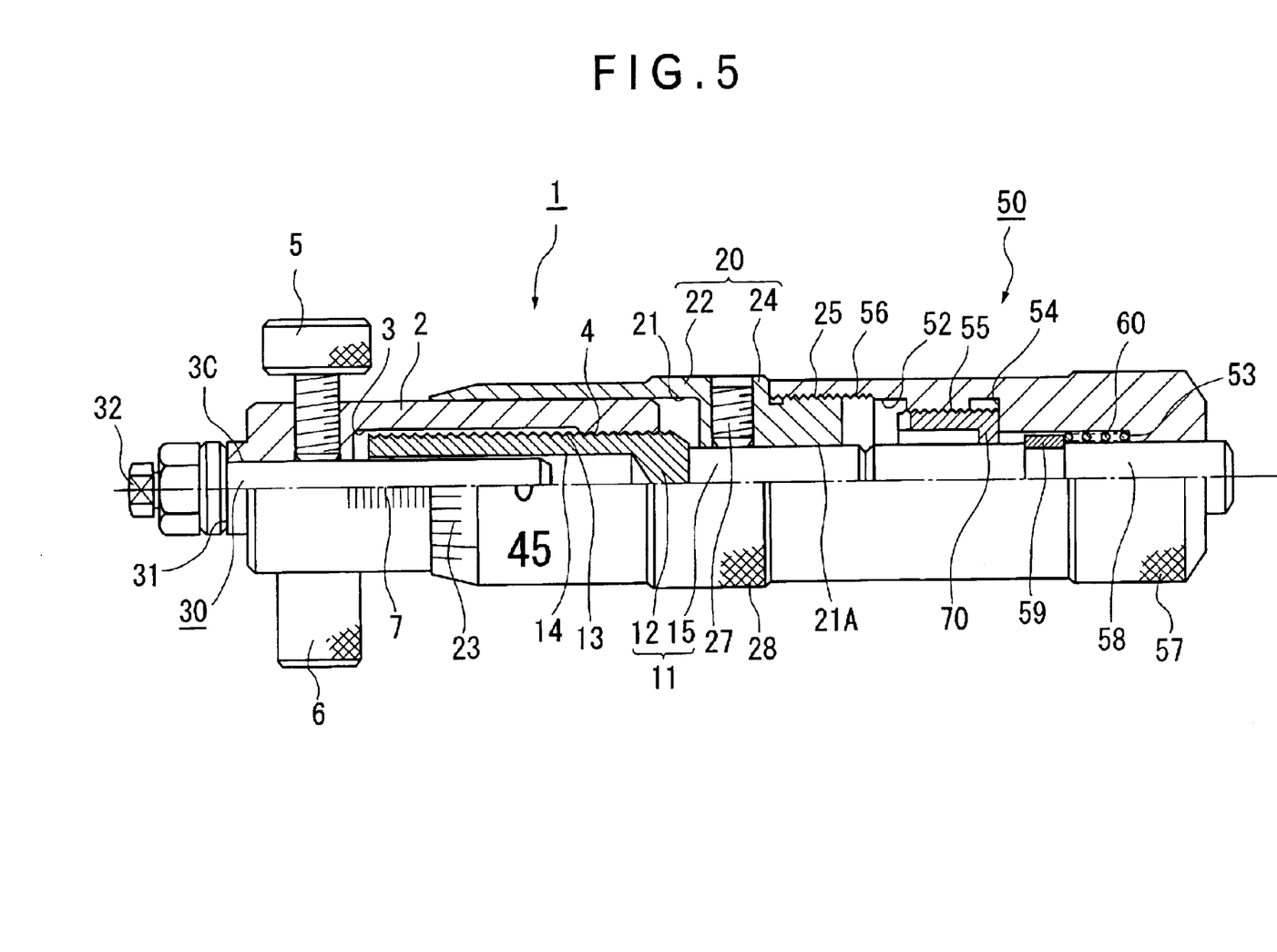
FIG. 5 is a partial side cross section showing the inside micrometer of the aforesaid embodiment, where the extending rod and anvil are attached to the inside micrometer body.

FIG. 5 shows the inside micrometer body 1 to which the anvil 30 and the extending rod 50 are attached.

According to the above arrangement, the first spindle 11 is extended by the length s of the second spindle 58. In other words, when the thimble 20 is rotated, the first spindle 11 is advanced and retracted and the thimble 20 and the second spindle 58 of the extending rod 50 are integrally advanced and retracted. By bringing an end of the second spindle 58 and the probe 32 of the anvil 30 into contact with the workpiece, the dimension of the target portion of the workpiece can be measured.

Figure 6:
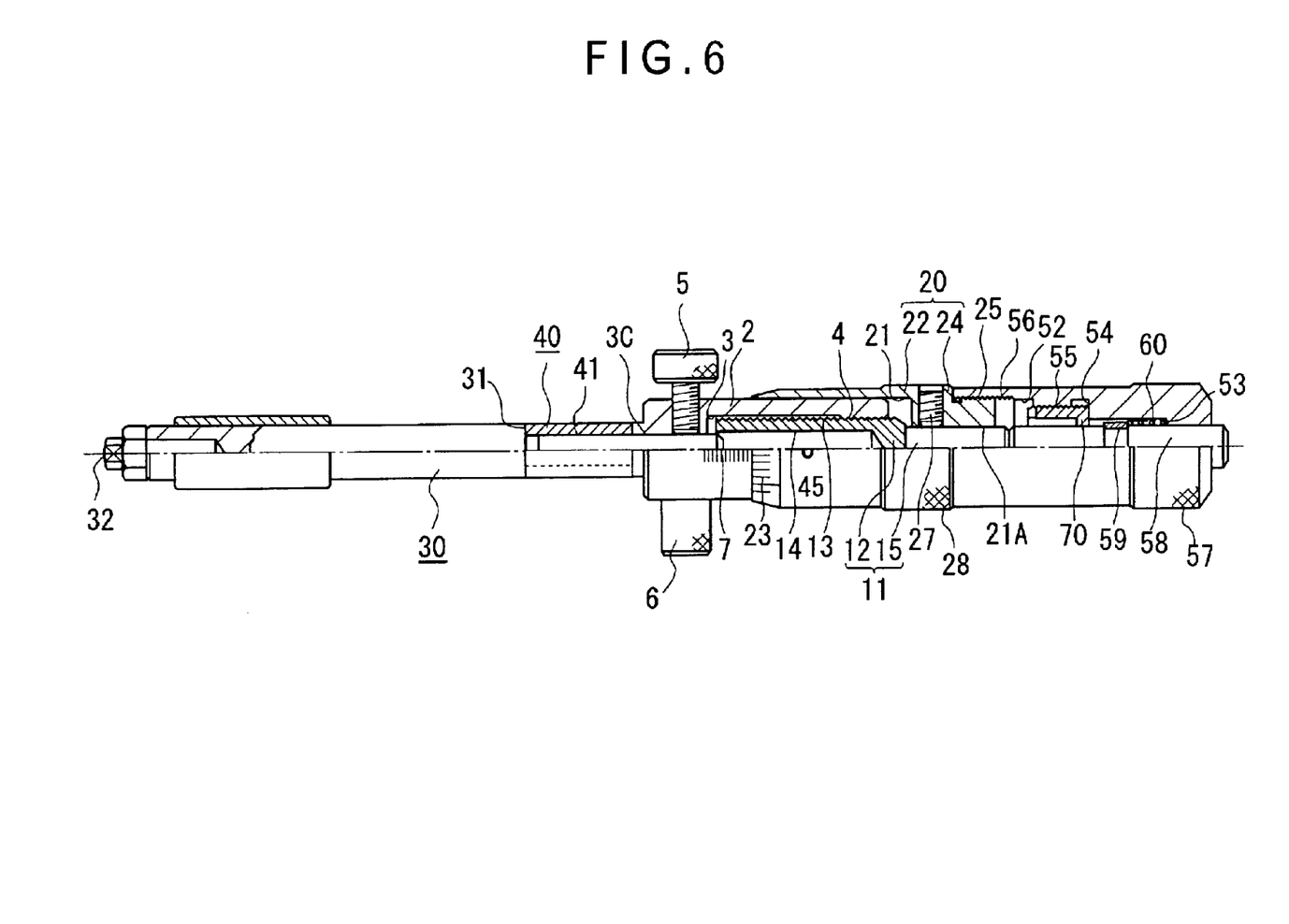
FIG. 6 is a partial side cross section showing the inside micrometer of the aforesaid embodiment, where the extending rod, extending collar and anvil are attached to the inside micrometer body.

FIG. 6 shows the inside micrometer body 1 to which the anvil 30, the extending rod 50 and the extending collar 40 are attached.

According to the above arrangement, the first spindle is extended by the length s of the second spindle and the anvil 30 is extended by the length k of the extending collar 40. Accordingly, by rotating the thimble 20 to bring the probe 32 of the anvil 30 and an end of the second spindle 58 into contact with the workpiece, the dimension of the target portion of the workpiece can be measured.

According to the inside micrometer of the present embodiment, following advantages can be obtained.

When the thimble 20 is rotated, the first spindle 11 rotates together with the thimble. At this time, since the external thread 13 of the first spindle 11 and the internal thread 4 of the cylinder 2 are screwed, the first spindle 11 can be advanced and retracted in accordance with the pitch of the screws 4 and 13 from the first end of the cylinder. The movement distance of the first spindle 11 is read from the scales 7 and 23 formed on the cylinder 2 and the thimble 20 to measure the workpiece.

Figure 7:
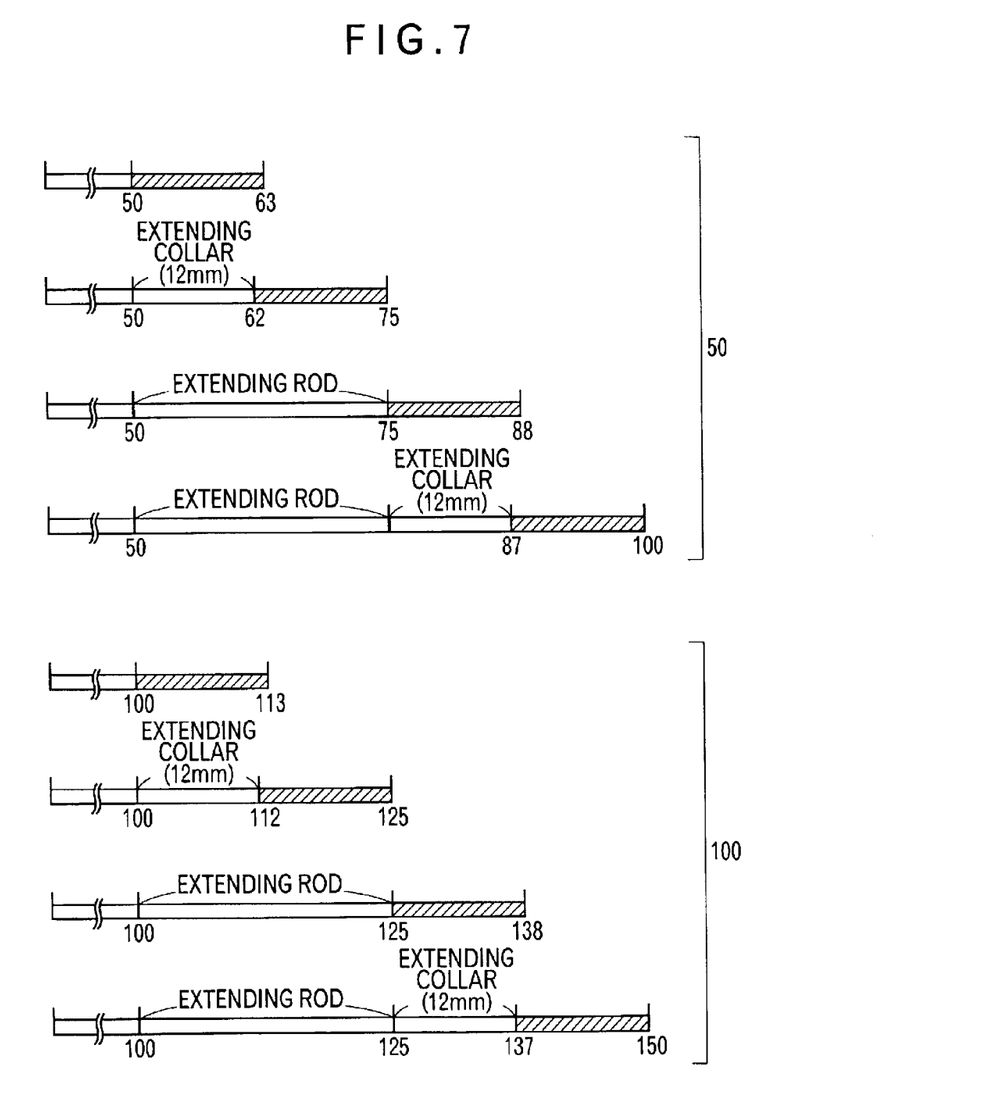
FIG. 7 is an illustration showing measurement area according to the aforesaid embodiment when the anvil, the extending collar and the extending rod are selectively used.

In the present embodiment, the moving distance of the first spindle 11 of the inside micrometer body 1 is 13 mm, the extending collar 40 is 12 mm, the extending rod 50 is 25 mm. The anvils 30 are for lengths of 50 mm, 100 mm, 150 mm, 200 mm and 250 mm.

Accordingly, as shown in FIG. 7, the entire range from 50 mm to 300 mm can be set as a measurement range.

In the present invention, the relationship of $k \leq v$, $s \leq v+k$, $d \leq v+k+s$ may preferably be satisfied, where the moving distance of the first spindle is v, the length of the first extension member is k, the length of the second spindle of the second extension member is s and the increment of the length of the anvil is d.

Specifically, when only the anvil 30 for 50 mm is attached to the inside micrometer body 1, the measurement range is from 50 mm to 63 mm.

When the anvil 30 for 50 mm and extending collar 40 of 12 mm length are used, the measurement range is from 62 mm to 75 mm.

When the extending collar 40 is detached and the anvil 30 for 50 mm and the extending rod 50 of 25 mm length are used, the measurement range is from 75 mm to 88 mm.

When the anvil 30 for 50 mm, the extending collar 40 and the extending rod 50 are used, the measurement range is from 87 mm to 100 mm.

Accordingly, the measurement range from 50 mm to 100 mm can be covered by the combination of the anvil 30 for 50 mm, the extending collar 40 and the extending rod 50.

By exchanging the anvil 30 for 50 mm with the anvil 30 for 100 mm, the measurement range from 100 mm to 150 mm can be measured by selectively attaching the extending collar 40 and the extending rod 50 in the same manner as the above.

Since the anvils 30 of different length in increments of 50 mm for the maximum use for the length of 250 mm are prepared in the present embodiment, the measurement range can be from 50 mm to 250 mm.

Further, by preparing anvils 30 having different length in increments of 50 mm such as for 300 mm and 350 mm, the measurement range can be extended in succession.

In the conventional arrangement using no extending rod 50, when the same components except for the extending rod 50, such as an inside micrometer body 1 having moving distance of 13 mm and extending collar 40 of 12 mm long are used, anvils 30 having different lengths in increments of 25 mm have to be prepared for obtaining successive measurement range. Specifically, in order to measure the range from 50 mm to 300 mm, ten anvils 30, i.e. anvils of 50 mm, 75 mm, 100 mm, 125 mm, 150 mm, 175 mm, 200 mm, 225 mm, 250 m and 275 mm lengths, have to be prepared.

On the other hand, since the extending rod 50 of 25 mm long is used in the present embodiment, only five anvils 30 are necessary as described above, so that the number of components and the production cost can be reduced.

Since the anvils 30 for 75 mm, 125 mm, 175 mm, 225 mm and 275 mm lengths are of relatively great size among the components, the size of the accommodation case can be reduced by reducing the number of the components, thereby achieving eminent effect in portability, which is not restricted only to reduction of the number of components.

In the extending rod 50, the second spindle 58 is biased by the spring 60 toward the second end, i.e. toward the first spindle, and is advanceable and retractable in the axial direction in the through-hole 52 of the extending rod body 51. Accordingly, when the second spindle 58 is attached to the second end side of the inside micrometer body 1, the second spindle 58 is pushed to an end of the probe 15 of the first spindle 11 toward the first end side. At this time, since the first spindle 11 and the second spindle 58 are in close contact without gap by virtue of the biasing force of the spring 60, an effect equal to accurately extending the first spindle 11 by the length of the second spindle 58, 25 mm in the present embodiment, can be obtained.

Even when the length of the probe 15 projecting from the second end side of the thimble 20 of the inside micrometer body 1 is changed, the second spindle 58 can flexibly change the position thereof by the biasing force of the spring 60. In other words, since the first spindle 11, the probe 15 and the second spindle 58 are integrally moved, the measurement accuracy is not deteriorated.

Since the external thread 25 is provided on the second cylinder 24 of the thimble 20 and the internal thread 56 is provided on the second end side of the through-hole of the extending rod body 51, the extending rod 50 can be easily attached and detached to the inside micrometer body 1 by screwing.

Since the thimble 20 and the extending rod 50 are united by screwing as described above, the second spindle 58 of the extending rod 50 can be integrally moved when the first spindle 11 is moved together with the thimble 20 by rotating the thimble 20.

Since the external thread 13 of the first spindle 11 and the internal thread 4 of the cylinder 2 are right-hand threads while the internal thread 56 of the extending rod body 51 and the external thread 25 of the thimble 20 are left-hand threads, the extending rod 50 is not detached when the knurl 57 provided on the extending rod 50 is rotated so that the thimble 20 is rotated rightward to advance the first spindle 11 relative to the cylinder 2, thereby enhancing operability thereof.

The structure of the inside micrometer body 1 of the present embodiment and the conventional one are different with respect to the following points.

In the conventional arrangement, the cylinder 2 of the present embodiment is divided into separate bodies of the inner cylinder 2A and the outer cylinder 2B as shown in FIG. 9. In other words, the cylinder 2 is composed of the inner cylinder 2A having the through-hole 3 with the internal thread 4 formed on the inner circumference thereof adjacent to the first end side and the outer cylinder 2B attached to the outside of the inner cylinder 2A.

This is because the scale 7 is carved on the outer cylinder 2B separate from the inner cylinder 2A, for the inner cylinder 2A is deformed when the scale 7 is carved by carving process.

However, in the present embodiment, since the deformation of the cylinder 2 can be prevented by directly forming the scale 2 on the cylinder 2, the conventional inner cylinder 2A and the outer cylinder 2B are integrated as the cylinder 2 as shown in FIG. 2. Accordingly, the number of the component can be reduced and the manufacturing process can be simplified, thereby lowering production cost.

In the conventional arrangement, the first spindle sheath 12 and the probe 15 are separated, and the through-hole 14A are provided on the first spindle sheath 12, where the inner circumference adjacent to the opening on the first end side of the through-hole 14A and the probe 15 are screwed, as shown in FIG. 9. The opening 21A on the first end side of the through-hole 21 of the thimble 20 and the outer circumference of the first spindle sheath 12 are mutually fitted at the taper 27A widening from the first end side to the second end side, which are clamped by the nut 27B screwed to the probe 15 to integrate the first spindle sheath 12, the probe 15 and the thimble 20.

On the other hand, in the present embodiment, the first spindle sheath 12 and the probe 15 are integrated as shown in FIG. 2, the tapered portion of the first spindle sheath 12 and the thimble 20 is omitted, and the thimble 20 and the probe 15 are secured by pressing the screw 27, thereby reducing the number of components and production cost and simplifying the production process.

Conventionally, a plurality of slits 3A are formed on the first end side of the inner cylinder 2 in the axial direction, which are clamped by screwing the nut 3B from the outside of the first end side of the inner cylinder 2, thereby accurately screwing the first spindle 11 and the inner cylinder 2.

The above arrangement is for adjusting the clearance between the screws 4 and 13 by clamping the nut 3B when the screws 4 and 13 of the first spindle 11 and the inner cylinder 2 become shaky on account of frequent rotation of the first spindle 11.

However, the inside micrometer is mainly used for measuring as a limit gauge, and clearance is not likely to be generated between the screws 4 and 13 on account of frequent rotation of the first spindle 11.

Accordingly, in the present embodiment, the slit 3A and the nut 3B are not provided, thereby reducing the number of components and production cost and simplifying the production process.

Incidentally, the inside micrometer according to the present invention is not restricted to the above embodiment but include various modifications as long as an object of the present invention can be achieved.

Though the extending rod 50 having the second spindle 58 inserted into the through-hole 52 of the extending rod body 51 is screwed to the thimble 20 as the second extension member in the above embodiment, the specific shape is not limited to the above embodiment as long as the second spindle 58 can be attached to the first spindle 11. For instance, the first end side of the first spindle 11 and the second end side of the second spindle 58 may be simply screwed. Further, the second extension member may not be screwed but may be fixed by connection ring or magnetic force.

The biasing means for biasing the second spindle 58 is not restricted to the spring 60 but any resilient body may be used. Further, the biasing means may be arranged in any manner as long as the first spindle 11 and the second spindle 58 are in close contact, such as providing a magnet on an end of the first spindle 11 and an end of the second spindle 58 opposing the end of the first spindle 11.

Though the external thread on the first end side of the thimble and the internal thread provided on the second end side of the extending rod body are screwed in the above embodiment, the reverse arrangement, i.e. internal thread on the first end side of the thimble and the external thread on the second end side of the extending rod body, is possible.

Though the moving distance of the first spindle 11 of the inside micrometer body 1 is 13 mm, the extending collar 40 is 12 mm long, the second spindle 58 of the extending rod 50 is 25 mm long and the difference of the length of the anvil 30 is 50 mm, any length may be used for securing continuous measurement range as long as the relationship specified in claim 2 can be satisfied.

What is claimed is:

1. An inside micrometer, comprising:
    an inside micrometer body including a cylinder having a first end, a second end and a first through-hole therebetween, the inner circumference of the first through-hole being provided with an internal thread, a first spindle screwed to the internal thread in an advanceable and retractable manner from the first end of the first through-hole, and a thimble provided on the outside of the cylinder, the thimble being capable of rotating integrally with the first spindle;
    a first extension member having a third end, a fourth end and a second through-hole therebetween, the third end of the first extension member attachable and detachable from the second end of the cylinder;
    a plurality of anvils having different lengths in increments of a predetermined dimension, each anvil attachable and detachable from the fourth end of the first extension member when the first extension member is attached to the second end of the cylinder and attachable and detachable from the second end of the cylinder when the first extension member is detached from the second end of the cylinder; and
    a second extension member attachable and detachable from first end side of the thimble the second extension member having a second spindle which advances and retracts relative to the second extension member together with the first spindle when the second extension member is attached to the first end side of the thimble, wherein the first spindle and the second spindle are in direct contact with each other.

2. The inside micrometer according to claim 1, wherein the relationship of $k \leq v$, $s \leq v+k$, $d \leq v+k+s$ is satisfied, where the moving distance of the first spindle is v, the length of the first extension member is k, the length of the second spindle of the second extension member is s and the increment of the length of the anvil is d.

3. The inside micrometer according to claim 1, the second extension member comprising: a second extension member body having a third through-hole at the center thereof, the second extension member body being attached to the first end side of the thimble in an attachable and detachable manner; the second spindle inserted in and being advanceable and retractable from a first end of the third through-hole of the second extension member body in an axial direction; and a biasing means for biasing the second spindle toward the first spindle.

4. The inside micrometer according to claim 1,
    wherein an external thread is formed on one of a second end side of the second extension member and the first end side of the thimble, and an internal thread to be screwed to the external thread is formed on the other of the second end side of the second extension member and the first end side of the thimble.

* * * * *